Oct. 26, 1965 SHIGETOSHI SAITO 3,213,518
METHOD OF MAKING A BALL BEARING ASSEMBLAGE
Filed Feb. 27, 1964
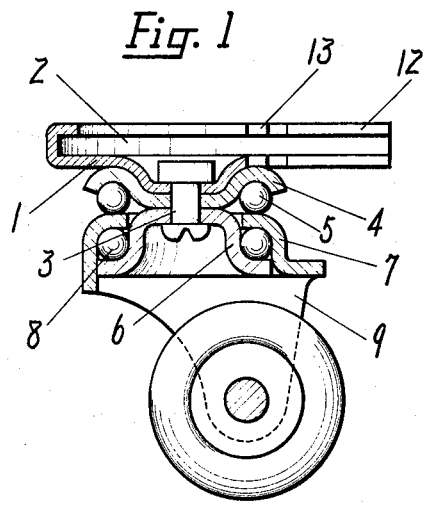
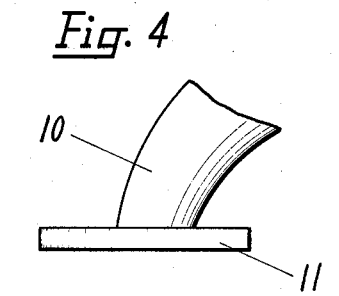
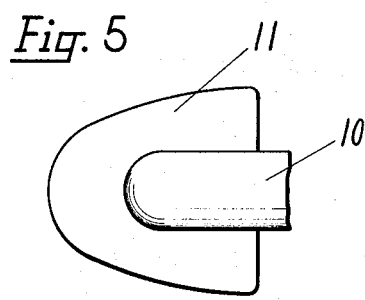
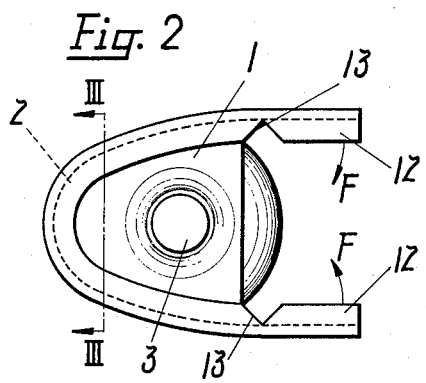
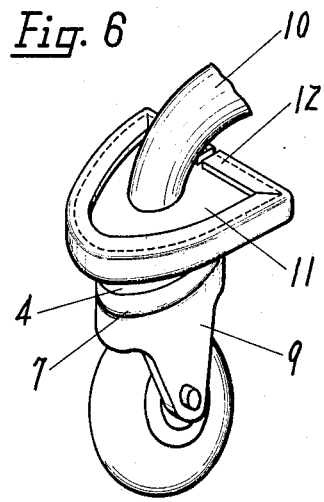
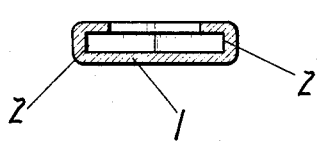
INVENTOR
Shigetoshi Saito
BY
ATTORNEY

United States Patent Office 3,213,518
Patented Oct. 26, 1965

3,213,518
METHOD OF MAKING A BALL BEARING ASSEMBLAGE
Shigetoshi Saito, 1 Yonchome, Hatchobori, Chuoku, Tokyo, Japan
Filed Feb. 27, 1964, Ser. No. 347,885
1 Claim. (Cl. 29—148.4)

The caster of the type which has a threaded rod protruding from the top plate has been well known. Such a caster is fixed to a leg of a chair, desk, bed or the like by threading said rod into the corresponding threaded hole formed in the end of the leg. However, not only such a practice is tedious and slow, but also the danger of the loosening of the caster from the leg always exists. Further, in case of a curved or bent leg wherein it is impossible to form a sufficiently long hole, such a caster can not be fixed.

The present invention has for its object to do away with such defects by a particular method of making a ball bearing assemblage. According to this invention, instead of the threaded rod, the top plate of the caster is provided with a turned up edge around its periphery except at one side and the leg of a chair, desk, bed or the like is provided with a flange at one end.

In assemblage, after the flange of the leg is inserted in the turned up edge and said flange is placed on the top plate, the periphery of the flange is clamped by the turned up edge by press work. In this manner, according to the present invention, the caster can be fixed to the leg rapidly and firmly without the danger of becoming loose from the leg. Further, the caster may be fixed to a curved or bent leg as well.

The invention may be best understood by reference to the following drawings in which:
FIG. 1 is a sectional view of the caster,
FIG. 2 is the plan view of the top plate,
FIG. 3 is the sectional view of the top plate through the line III—III of FIG. 2,
FIG. 4 shows a side view of a curved leg having a flange at its end,
FIG. 5 is the plan view of the same, and
FIG. 6 is a perspective view of the assemblage.

The caster shown here is similar to the known type except its top plate 1 which is provided with a turned up edge 2 around its surface except at one side. Said turned up edge has at both ends extensions 12 extending beyond the open side of the top plate 1. Between the main turn up edge and the extensions, angular cut-outs or notches 13 are formed. 3 is a rivet passing through the opening formed in the top of the swivel yoke 9 and clamping the top plate 1, cap 4 and retainer 6 together. 5 are upper balls retained between the cap 4 and the flare-up portion 7 of the yoke 9 while 8 are lower balls retained between the flare-up portion 7 and retainer 6. The rivet 3, top plate 1, cap 4 and retainer 6 are as a whole freely rotatable relatively to the swivel yoke 9. The leg 10 is provided with a flange 11 at its end.

In assemblage, first the flange 11 is inserted in the turn up edge 2 from the open side of the top plate 1 and said flange is placed on the top plate, then the extensions 12 are bent in the direction shown by the arrow F so as to engage the rear side of the flange 11, and lastly, the edge 2 and the extensions 12 are subjected to press work whereby the flange is firmly clamped by them.

In this manner, the caster can be rapidly and firmly fixed to the leg without the danger of loosening.

If desired, the extensions 12 may be omitted.

What I claim:

The method of manufacturing a ball bearing assemblage consisting in forming a leg having a flange at its end, forming a top plate having a larger configuration than said flange, turning up the edge of said top plate except at a side which has extensions to form a channel, forming cut-outs at the base of said extensions, riveting together the top plate, a cap, and a retainer of a ball bearing and caster assembly, inserting the flange of said leg in the channel of the turned up edge from the open side of the plate, then bending said extensions towards each other to engage the rear side of the flange, and finally pressing the turned up edges to firmly clamp the inserted flange.

References Cited by the Examiner
UNITED STATES PATENTS

| | | | |
|---|---|---|---|
| 1,995,035 | 3/35 | McArdle | 29—511 |
| 2,500,886 | 3/50 | Torkelson | 29—148.4 |
| 3,090,241 | 5/63 | Mageoch et al. | 29—148.4 |

WHITMORE A. WILTZ, *Primary Examiner.*
THOMAS H. EAGER, *Examiner.*